United States Patent
Pfister et al.

(10) Patent No.: US 7,230,620 B2
(45) Date of Patent: Jun. 12, 2007

(54) RENDERING DEFORMABLE AND ANIMATED SURFACE REFLECTANCE FIELDS

(75) Inventors: Hanspeter Pfister, Arlington, MA (US); Tim Weyrich, Zurich (CH); Markus Gross, Uster (CH)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 365 days.

(21) Appl. No.: 10/912,724

(22) Filed: Aug. 5, 2004

(65) Prior Publication Data

US 2006/0028474 A1     Feb. 9, 2006

(51) Int. Cl.
*G06T 15/60*     (2006.01)

(52) U.S. Cl. .................................................... 345/426

(58) Field of Classification Search ..................... None
See application file for complete search history.

(56) References Cited

U.S. PATENT DOCUMENTS

| | | | |
|---|---|---|---|
| 5,704,024 A * | 12/1997 | Voorhies et al. ............ 345/426 |
| 6,448,968 B1 | 9/2002 | Pfister et al. ............... 345/423 |
| 6,744,435 B2 | 6/2004 | Zwicker et al. ............. 345/424 |
| 6,791,542 B2 * | 9/2004 | Matusik et al. ............. 345/420 |
| 2003/0231174 A1 | 12/2003 | Matusik et al. ............. 345/419 |
| 2004/0001059 A1 | 1/2004 | Pfister et al. ............... 345/419 |

OTHER PUBLICATIONS

Matusik et al. Image-Based 3D Photography Using Opacity Hulls. Proceedings of the 29th Annual Conference on Computer Graphics and Interactive Techniques. ACM Press. 2002. p. 427-437.*

C. Buehler, M. Bosse, L. McMillan, S. Gortler, and M. Cohen. Unstructured lumigraph rendering. In *Computer Graphics*, SIGGRAPH 2001 Proceedings, pp. 425-432, Los Angeles, CA, 2001.

R. Furukawa, H. Kawasaki, K. Ikeuchi, and M. Sakauchi. Appearance based object modeling using texture database: Acquisition, compression and rendering. In *Proceedings of the 13th Eurographics Workshop on Rendering*, Pisa, Italy, Jun. 2002.

W. Matusik, H. Pfister, A. Ngan, P. Beardsley, R. Ziegler, and L. McMillan. Image-based 3d photography using opacity hulls. *ACM Transaction on Graphics*, 21(3) :427-437, Jul. 2002. ISSN 0730-0301 (Proceedings of ACM SIGGRAPH 2002).

D. Wood, D. Azuma, K. Aldinger, B. Curless, T. Duchamp, D. Salesin, and W. Stuetzle. Surface light fields for 3d photography. In *Computer Graphics*, SIGGRAPH 2000 Proceedings, pp. 287-296, Los Angeles, CA, Jul. 2000.

Z. Zhang. L. Wang, B. Guo, and H.-Y. Shum. Feature-based light field morphing. In *Computer Graphics*, SIGGRAPH 2002 Proceedings, pp. 457-464, Jul. 2002.

* cited by examiner

*Primary Examiner*—Ulka Chauhan
*Assistant Examiner*—Peter-Anthony Pappas
(74) *Attorney, Agent, or Firm*—Dirk Brinkman; Clifton D. Mueller; Gene V. Vinokur

(57) ABSTRACT

A method renders a model of an object by first acquiring, in an acquisition space, a reflectance field of the object. The reflectance field includes a set of reflectance images of the object and a point model of the object. The model is deformed in an object space to generate a deformed model. For each point of the deformed model in the object space, the set of the reflectance images is queried in the acquisition space to obtain reflectance coefficients for each point. Each point of the deformed model is then shaded according to the corresponding reflectance coefficients to generate an image of the object reflecting the deforming.

20 Claims, 6 Drawing Sheets

RENDERING DEFORMABLE AND ANIMATED SURFACE REFLECTANCE FIELDS

FIELD OF THE INVENTION

This invention relates generally to computer graphics, and more particularly to rendering surface reflectance fields.

BACKGROUND OF THE INVENTION

Visualization and animation of realistic 3D computer graphics models are important for many applications, such as computer games, movies, advertisement, and virtual environments. Generally, the following methods are used to reproduce a visual appearance of real objects: model-based rendering, image-based rendering, and hybrid rendering that uses both models and images.

In model-based methods, the reflectance properties of 3D objects are typically acquired by 3D photography. For explicit appearance models, a parametric bi-directional reflectance distribution function (BRDF) is fit to the acquired image data. Parametric BRDFs can be rendered efficiently on graphics hardware. The underlying model can be animated and deformed using well-developed techniques, such vertex blending. However, parametric BRDFs cannot acquire many effects of real-world materials, such as translucency, inter-reflections, self-shadowing, and subsurface scattering.

On the other hand, image-based rendering is well suited to acquire and represent objects having a complex appearance. However, image-based rendering is restricted to viewpoints of the acquired images. The lack of a 3D model makes deformations and animations very difficult, if not impossible.

Consequently, hybrid methods have become very popular. Hybrid methods parameterize acquired images onto a 3D model. The 3D model is then used for new viewpoints and animation. This representation is commonly known as a surface light field.

However, surface light fields can only provide novel renderings with a fixed lighting that corresponds to the acquired images. That is a severe limitation when it is desired to render the object in a new environment or under dynamically changing lighting.

A better hybrid representation uses a surface reflectance field. The surface reflectance field expresses an appearance of an object for many possible lighting configurations. Objects with arbitrary reflectance properties can be rendered from any arbitrary viewpoint under new lighting.

However, up to now the deformation and animation of objects with reflectance fields has not been possible.

In general, animating an image-based or hybrid appearance representation requires a process to evaluate the image-based data to simulate varying object deformations.

It is a problem to preserve the visual appearance of the deformed object surface. In other words, the perceptual impression of material properties of the object under mutable lighting conditions needs to be preserved as the object is deformed.

Therefore, there is a need to animate an object with a surface reflectance field with arbitrary deformations.

The prior art for three-dimensional rendering generally describes methods that acquire object shape and appearance from images. Some 3D rendering methods fit a parametric BRDF model to the acquired appearance data. However, parametric BRDFs cannot represent many of the reflectance properties of real objects.

In contrast, image-based appearance representations make no assumptions about the reflection property of materials. A lumigraph combines a 3D model, e.g., a visual hull of the object, with an image-based representation. Images of the object are represented as a dense light-field, and the model is used to improve light-field interpolation, i.e., to minimize ghosting.

To reduce the amount of image data required, view-dependent texture mapping can be used. Texture mapping uses a simple model and sparse texture data. That method is effective despite an approximate 3D model. However, that method has some limitations for highly specular surfaces due to a relatively small number of textures.

Surface light fields are a more general and efficient representation because surface light fields parameterize the image data onto the model surface. Surface light fields can either be associated with an accurate, high-density model, or with coarse triangular meshes for objects with low geometric complexity.

Some methods compress the light field data such that the models can be rendered in real-time using graphics hardware. To improve the appearance of complex object silhouettes, surface light fields can be combined with view-dependent opacity data into opacity light fields.

Unstructured lumigraph rendering is an effective method for rendering both surface and opacity light fields. Although surface light fields are capable of reproducing important global effects such as inter-reflections and self-shadowing, those methods only show the object under fixed lighting.

To overcome that limitation, surface reflectance fields have been used. The surface reflectance field of an object represents radiant light reflected from a surface under many possible incident lighting conditions. In practice, the surface reflectance field is sampled sparsely, and the sparse samples are interpolated while rendering. To further reduce the amount of data, most prior art reflectance fields are acquired for a single view. For approximately planar model geometry and diffuse surfaces, the data can be compressed further by fitting a parametric function to the surface reflectance field.

Surface reflectance fields can be generated from data acquired by 3D photography, W. Matusik, H. Pfister, A. Ngan, P. Beardsley, R. Ziegler, and L. McMillan, "Image-based 3D photography using opacity hulls," *ACM Transaction on Graphics,* 21(3): pp. 427–437, July 2002. That system acquires surface reflectance fields for over four hundred views using multiple cameras, turntables, and a rotating array of lights. The approximate geometry is a visual hull of the objects, U.S. patent application, 20020159628, Matusik et al., filed Oct. 31, 2002, "Image-based 3D digitizer."

Although it is an important aspect for many practical applications, the animation of image-based data has received very little attention. Wood et al. describe arbitrary deformations on a surface light field and produce plausible renderings of the deformed model, D. Wood, D. Azuma, K. Aldinger, B. Curless, T. Duchamp, D. Salesin, and W. Stuetzle, "Surface light fields for 3d photography," *Computer Graphics,* SIGGRAPH 2000 Proceedings, pages 287–296, July 2000. However, that method does not deal properly with the diffuse component of the surface color. That method only works for purely reflective isotropic BRDFs.

Feature-based light field morphing 'blends' two light fields into one based on the concept of ray-correspondencies, Z. Zhang, L. Wang, B. Guo, and H.-Y. Shum, "Feature-based light field morphing," *Computer Graphics*, SIGGRAPH 2002 Proceedings, pages 457–464, July 2002. That method requires substantial user input to specify corresponding feature polygons between the two light fields. That method is not applicable to the general animation setting, and the method only works with static lighting.

Furukawa et al. describe a scanning system to acquire models of objects and spatially varying BRDFs, also called bi-directional texture functions (BTFs), R. Furukawa, H. Kawasaki, K. Ikeuchi, and M. Sakauchi, "Appearance based object modeling using texture database: Acquisition, compression and rendering," *Proceedings of the* 13*th Eurographics Workshop on Rendering*, June 2002. That method uses tensor product expansion to compress the BTF data. That method relies on an exact model to support the BTF representation. Thus, the shape of the object has to be acquired with a range scanning device, which is expensive, time consuming, and complex. Moreover, that method does not explicitly address appearance preservation under non-uniform deformations.

Therefore, it is desired to provide a rendering method that can deform and animate models of objects using surface reflectance fields so that objects can be placed in virtual environments with arbitrary lighting, including dynamically changing lighting.

SUMMARY OF THE INVENTION

The invention provides a method for rendering deformed and animated surface reflectance fields under arbitrary lighting. The deforming is achieved by modifying an underlying model of a 3D object. The method augments the model with a local parameterization that enables a correct evaluation of acquired reflectance images while preserving an original light model on the deformed model.

DETAILED DESCRIPTION OF THE PREFERRED EMBODIMENT

Figure 1:
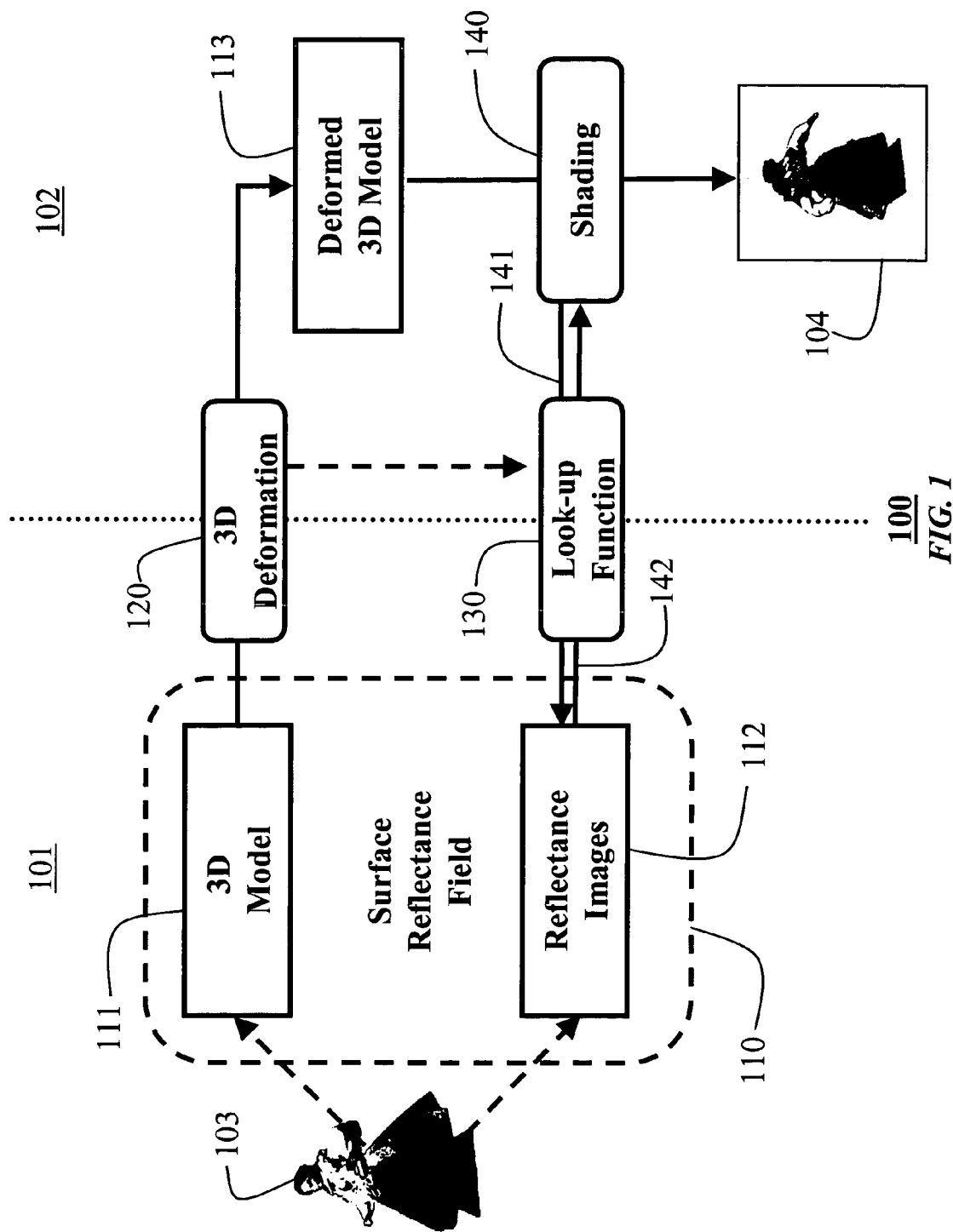
FIG. 1 is a block diagram of a method and system for rendering deformed and animated surface reflectance fields according to the invention.

FIG. 1 shows the basic structures and operations of our invention 100. A surface reflectance field (SRF) 110 is generated for a 3D object 103 in an acquisition space 101, i.e., a coordinate system with respect to the real world. The SRF 110 includes a 3D model 111 and reflectance images 112 of the object. The model is deformed 120 to produce a deformed 3D model 113 in an object space 102, i.e., a coordinate system with respect to the object. A look-up function 130 is applied 141 to the reflectance images 112 according to the deformation to produce reflectance coefficients 142 that are used to shade 140 the deformed 3D model to generate an image 104. The deforming and shading can be performed in real-time to produce a deformation and animation of the object as a sequence of images, i.e., a video.

The 3D model 111 can be constructed in any manner. For example, the 3D model can be a visual hull acquired from silhouette images, or laser range data, and the like. The model can use a mesh of 2D polygons or discrete zero-dimensional points to represent a shape of a surface of the object 103. Alternatively, for objects having simple geometric shapes yet complex material properties (texture), e.g., balls, cubes, cylinders, the model can be represented parametrically. In any case, the model 111 specifies multiple points in 3D that represent the shape of the surface of the 3D object 103.

The reflectance images 112 can be acquired by a camera at various viewpoints and under varying directional lighting. We use hundreds of images. In order to preserve the appearance of the object, we interpolate the reflectance images 112 for each surface point of the model.

To shade 140 a particular point of the deformed model 113, we apply the look-up function 130 to the point, for a particular viewing direction and particular incident light. The point is shaded 140 by interpolating the reflectance images according to the viewing and lighting direction mapped back to the acquisition space 101.

Deformable Surface Reflectance Fields

Ignoring global light transport, the surface reflectance field 110 is a discrete sampling of bi-directional reflectance distribution functions (BRDFs) of the object 103, knowing neither the exact location of the surface, nor normals of the surface. Ignoring wavelengths and time, the BRDF is a scalar function BRDF(l, v). The finction describes the fraction of light that is reflected in the direction v as the surface of the object is lighted from the direction l.

Similar to the BRDF notation, we use the notation SRF(p, l, v) to denote the reflectance of the SRF for a deformed model point p, a light direction l, and a viewing direction v. This relationship preserves the appearance of the surface during deformation and animation of the surface reflectance field.

The initial step for animating the SRF 110 repeatedly deforms 120 the model 111 in real-time. We assume the deformation is defined by a differentiable deformation function $$\Psi: \Re^3 \to \Re^3. \tag{1}$$

The shading 140 includes look-ups or queries 141 to the SRF 112 to determine a local reflectance of the object in terms of reflectance coefficients 142. When the model 111 is deformed, the shading operation 140 has to map a look-up (p*, l*, v*) in the object space 102 to a look-up (p, l, v) in the acquisition space 101.

The look-up function L 130 approximately follows an inverse deformation $\Psi^{-1}$. However, applying the inverse deformation $\Psi^{-1}$ to the lighting and viewing directions is not necessarily appearance preserving, especially in the case of non-uniform deformations according to the invention.

Approximate BRDF Preservation

In general, a mapping from the object space 102 to the acquisition space 101 that preserves all aspects of the appearance of the object 103 does not exist. This is due to the lack of an exact object geometry and material properties in the SRF representation 110. The exact object geometry and material properties are required to enable a prediction of complex non-local effects, such as self-shadowing and inter-reflections.

Therefore, we assume that the object 103 can be modeled by its local BRDFs. We provide a look-up function that tries to preserve the main characteristics of the original object BRDFs. The look-up function is a mapping $$L: (p^*, l^*, v^*) \mapsto (p, l, v). \quad (2)$$

We enforce appearance preservation by imposing three conditions.

Figure 2:
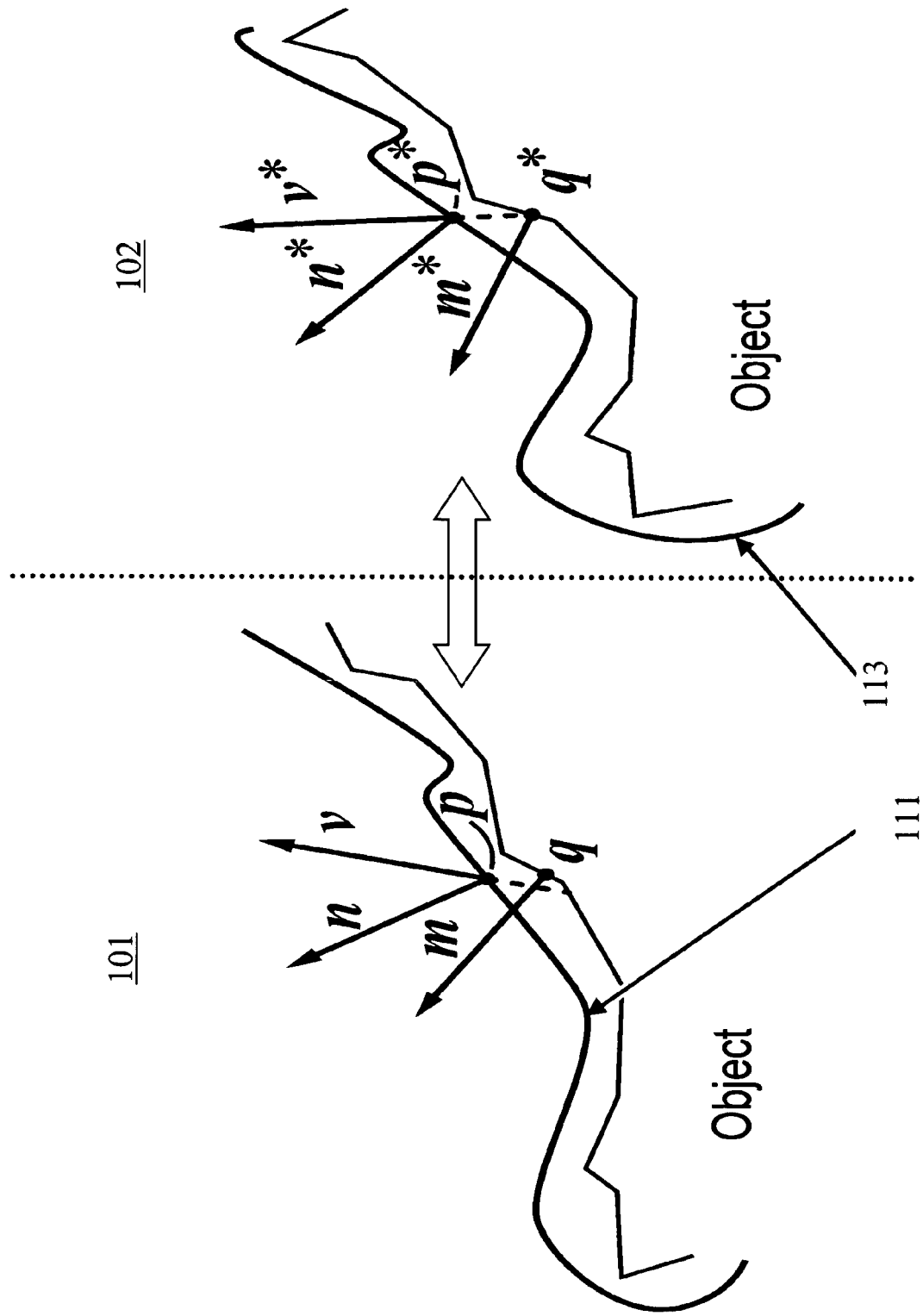
FIG. 2 is a schematic of viewing rays intersecting models of an object in acquisition and object spaces.

1. If the viewing ray in the object space $p^*+Sv^*$, $S \in R$ intersects a deformed point $q^*$ of the object, then the viewing ray in the acquisition space $p+tv$, $t \in R$ intersects the object at a corresponding point $q=\Psi^{-1}(q^*)$ in the acquisition space 101, see FIG. 2. This ensures that the reflected light originates from the same surface point with the same BRDF. Unfortunately, this condition can not be guaranteed, because the exact geometry of the object 103 is typically not known, i.e., the exact location of the points q and $q^*$ cannot be determined. However, it is a reasonable approximation to force the two viewing rays to intersect corresponding points of the model, because the model point p is very likely close to the object point q. This can be achieved by selecting $$p := \Psi^{-1}(p^*). \quad (3)$$

2. The lighting direction l and the surface normal m at the object point q encloses the same angle γ as the lighting direction $l^*$ and the normal $m^*$ at the deformed object point $q^*$. This is a necessary condition to retain the reflectance characteristics of the object, as for example, the shape of the reflectance lobes of the corresponding BRDF. The same condition applies for the viewing directions v and $v^*$. Preserving the shape of the reflectance lobes requires preservation of the angle between the directions $l^*$ and $v^*$ as well.

Figure 3:
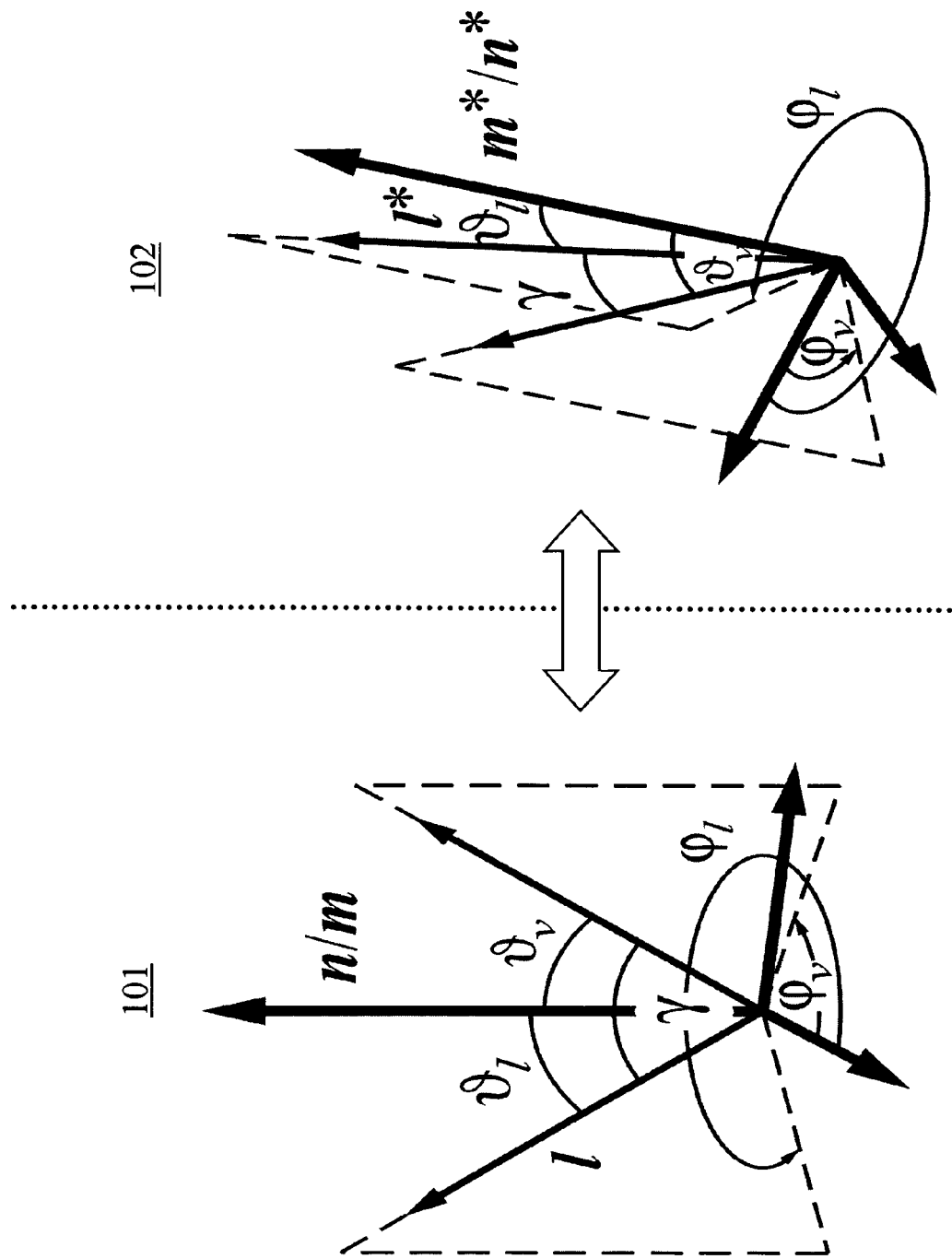
FIG. 3 is a schematic of local surface frames of a model in acquisition and object spaces.

As shown in FIG. 3, the bidirectional reflection distribution function (BRDF) describes the fraction of light from l that is reflected towards v. The spatial characteristics of a BRDF can be preserved by preserving the angles $v_l$, $v_v$, and γ when changing to the acquisition space. Anisotropic materials require the preservation of the azimuthal orientations $\phi_l$ and $\phi_v$ relative to the surface frame. The angles $\phi_l$ and $\phi_v$ are relative to the surface normal m. In the SRF, the normal m is not known exactly. Instead, the model normal n is taken as an approximation.

3. In order to preserve the effect of anisotropic object BRDFs, the directions l and v have the same azimuthal orientation φ relative to the object surface as the directions $l^*$ and $v^*$ on the deformed object.

As the point p follows immediately from Equation 3, the mapping $(p^*, l^*, v^*) \mapsto (l, v)$ needs to be determined. The mapping can be expressed as a locally affine mapping $$L_p^*:(l^*,v^*) \mapsto (l,v) \quad (4)$$

of lighting and viewing directions in the vicinity of the point $p^*$. Note, that the mapping $L_p^*$ is a function of $p^*$.

According to the second condition above, the look-up function $L_{p^*}$ needs to be angle preserving. By convention, the directions l, v, $l^*$, and $v^*$ are unit vectors. Therefore, the function $L_{p^*}$ also needs to be length preserving. This implies that the function $L_{p^*}$ is an isometry, as a function of the location of point $p^*$. This means that the effect of applying the look-up L on the directions $l^*$ and $v^*$ can be described by a rotation or a reflection, respectively. We assume the function $L_{p^*}$ to be a rotation. The special case of a reflection can be handled similarly.

Using this observation and interpreting Equation 3 as a translation of the point $p^*$ by $\Psi^{-1}(p^*)-p^*$, the total effect of applying the function L on a local setting around the point $p^*$ can be expressed as a rigid transformation, translating the point $p^*$ onto the point p, while rotating lighting and viewing directions.

Condition 2 further restricts the function L to rigid transformations that map the deformed object normal at the deformed point $q^*$ onto the original point q. However, we do not know the exact geometry of the object. Instead, we refer to the model normal at point p as an approximation of the true surface normal. Consequently, the function L maps the tangential plane of the deformed point $p^*$ onto the tangential plane at point p.

According to the condition 3, the function L preserve the directions $l^*$ and $v^*$ inside the tangential plane. We provide a local parameterization of the model, which enables us to track the transformation of the local tangential frame in order to find the mapping L that fulfills the above conditions.

Local Model Parameterization

We augment our model with a local parameterization. The local parameterization enables us to use the look-up function L at each point $p^*$ of our model. The parameterization is independent from the geometry of the model. The parameterization can by applied to triangular mesh models as well as to point sampled models. Depending on the model, the point $p^*$ can be a vertex of the mesh, or a non-connected surface point. The parameterization associates a set of parameters with every point $p^*$.

Given an arbitrary deformation $\Psi: R^3 \to R^3$, it is impossible to find a general explicit inverse function $\Psi^{-1}$. Constraining the SRF deformation to just the cases where an explicit inverse deformation function exists would be too limiting. Consequently, another design goal for our parameterization is to determine the function L without using a closed form of $\Psi^{-1}$.

As described above, the look-up function L can be decomposed into a translation and a rotation. The translation moves a deformed model point back to its original position, see Equation 3. Storing the original position $p_0$ at each deformed point $p^*$ enables the application of the translation without using the inverse function $\Psi^{-1}$.

Figure 4:
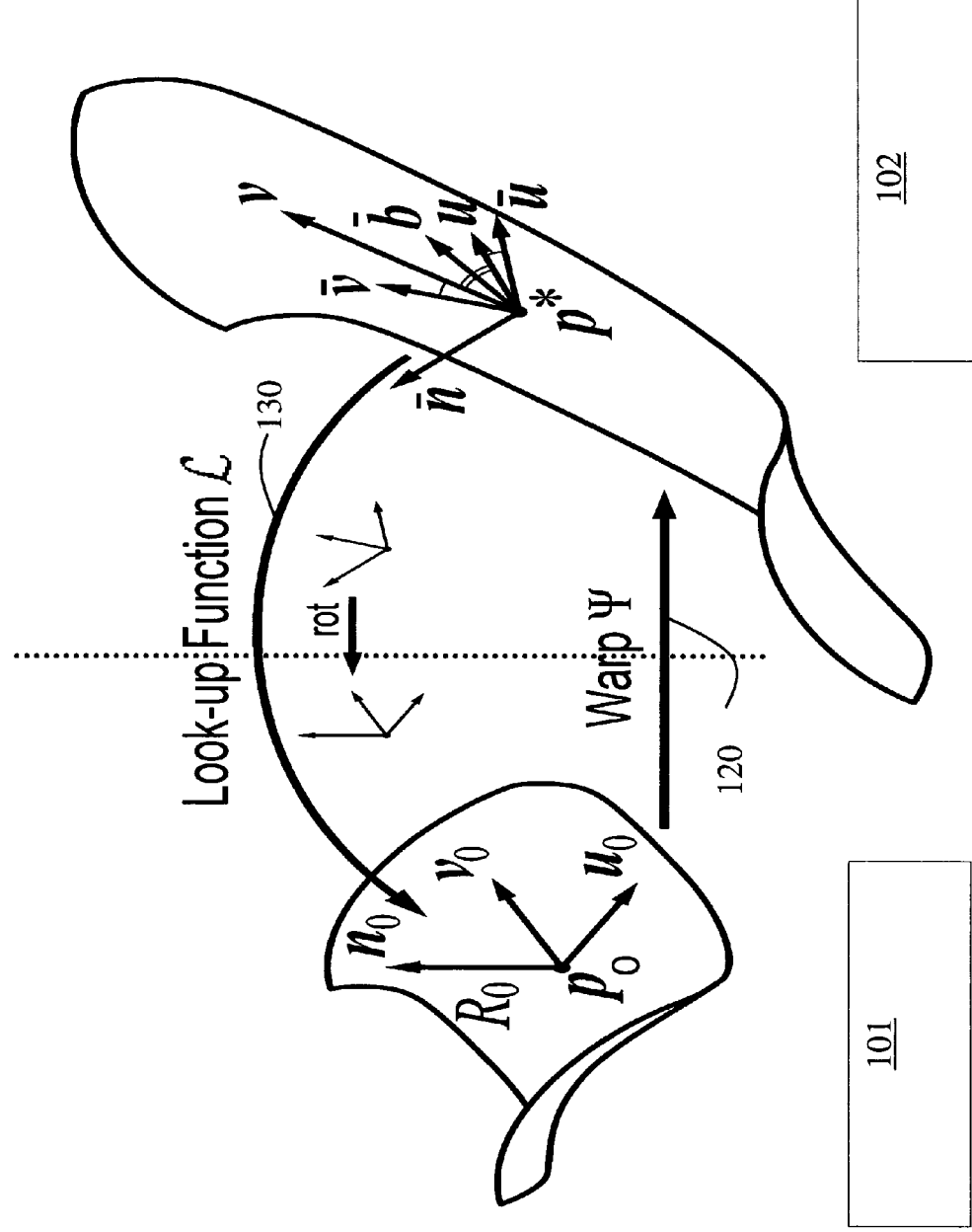
FIG. 4 is a schematic of a tangential system of a point in acquisition and object spaces.

As shown in FIG. 4, the rotational part $L_{p^*}$ of Equation 4 aligns the deformed tangential system of the point in the object space with the corresponding tangential system in the acquisition frame. For each point on the model, the local model parameterization provides two coordinate systems: an orthogonal tangential system $R_0$ in $p_0$ in the acquisition space 101 and its warped counterpart on the rendered model in the object space 102, defined by $p^*$ and the tangential system $(\bar{u}, \bar{v})$. During rendering, $p_0$, $R_0$, and the orthogonalized tangential system $(\bar{u}, \bar{v})$ are used to determine the appearance preserving back-projection of the SRF query 141.

To avoid the application of the inverse function $\Psi^{-1}$, a tangential orientation $R_0$ in the acquisition frame is associated explicitly with the point $p^*$. The tangential rotation $R_0$ is defined by a rotation matrix $(u_0, v_0, n_0)$. The rotation matrix is constructed by the tangential system in the acquisition space 101. The values $u_0$ and $v_0$ are orthogonal and can be selected arbitrarily. To minimize memory requirements, the matrix $R_0$ can be represented as a Rodrigues vector $$r_0 = k \tan(v/2),$$

given that the matrix $R_0$ is a rotation of angle υ around an axis k, Simon L. Altman, "Hamilton, Grassmann, Rodrigues, and the quatemion scandal—what went wrong with one of the major mathematical discoveries of the nineteenth century?," *Mathematical Association of America Journal*, December 1989. This definition provides a minimal three-dimensional parameterization of the matrix $R_0$. The matrix includes a singularity for 180° rotations that can be avoided in our context because the matrix $R_0$ is selected arbitrarily.

The local parameterization enables the determination of the look-up function L while rendering. The parameterization includes a set of vectors $\{p_0, r_0, u, v\}$ in $R^3$, associated with each point of the model. The vectors $p_0$ and $r_0$ are fixed, while the vectors u and v are adapted whenever the model is deformed 120. Table A gives the parameterization.

TABLE A

| Parameter | Description |
| --- | --- |
| $p_0$ | Original position of the deformed model point p* in the acquisition frame. |
| $r_0$ | Orientation matrix $R_0$ of the tangential system, in the acquisition frame, of the point p*, represented as a Rodrigues vector. |
| (u, v) | Local tangential frame of p*. |

Additionally, a tangential coordinate system (u, v) is associated with the point p*. While the vectors $p_0$ and $R_0$ remain constant during the deformation, the vector (u, v) is subject to the same deformation as the model. After a deformation by the deformation function $\Psi$, the vector (u, v) is set to $\Psi(u_0, v_0)$. Applying the deformation function $\Psi$ to a local tangential system is a standard problem in differential geometry. The tangential system is mapped by taking directional derivatives of the function $\Psi$. In our implementation, we use central differences to determine the vectors u and v according to:

$$u = \frac{1}{2\varepsilon}(\Psi(p_0 + \varepsilon u_0) - \Psi(p_0 - \varepsilon u_0)), \text{ and} \quad (6)$$

$$v = \frac{1}{2\varepsilon}(\Psi(p_0 + \varepsilon v_0) - \Psi(p_0 - \varepsilon v_0))$$

for a small incremental value $\varepsilon > 0$. In particular, this mapping only restricts the deformation function $\Psi$ to be differentiable in a vicinity of a particular point of the model.

Knowing the vectors $R_0$ and (u, v), the rotation $L_{p^*}$ can be reconstructed during rendering. Let $$\bar{n} = \frac{u \times v}{\|u \times v\|} \quad (7)$$

and $$\bar{b} = \frac{b}{\|b\|} \text{ with } b = \frac{u}{\|u\|} + \frac{v}{\|v\|} \quad (8)$$

be the normal and the normalized bisecting vector of the deformed tangential system spanned by the vectors u and v, respectively. Then, $$\bar{u} = \frac{1}{\sqrt{2}}(\bar{b} + \bar{b} + \bar{n}) \text{ and} \quad (9)$$

-continued $$\bar{v} = \frac{1}{\sqrt{2}}(\bar{b} + \bar{n} + \bar{b})$$

construct an orthogonalized tangential system that minimizes the squared angular differences between corresponding basis vectors of (u, v) and $(\bar{u}, \bar{v})$.

Using this orthogonalized system, the rotation $L_{p^*}$ is given by $$L_{p^*}(x) = R_0(\bar{u}, \bar{v}, \bar{n})^T x. \quad (10)$$

Note that by selecting the vectors $(\bar{u}, \bar{v})$ as described, the function $L_{p^*}$ is an approximation of tangential orientation preservation in the sense of condition 3, as described above.

In some respects, the look-up function L is a rigid transformation. For rigid object deformations and cases where the model and object surface coincide, rotating the reflectance field according to the inverse object transformation is the appropriate choice.

Consequently, this technique is used in many applications, e.g., in image-based BRDF measurement when acquiring reflectance properties, and for bump mapping, BTFs, and various other texturing techniques during shading processes.

However, it is not self-evident how to proceed for arbitrary, in particular non-uniform, skewed deformations 120 of a model that does not exactly match a real object, as required for the invention. Our observation is that rigid transformation of the model best meets the requirements of appearance preservation.

The invention enables the derivation of the look-up function L 130 for arbitrary deformations, using the local parameterization of the deformed model 113. Because the resulting transformation is rigid, material properties including anisotropic BRDFs remain constant, even for skewed deformations.

Shading

After the function L is determined, a model point can be shaded 140 as described above. However, there are still some other problems that need to be considered when lighting a deformed surface reflectance field according to the invention. When using an environment map to light an SRF, the map needs to be filtered according to a spatial resolution of the reflectance images representing the SRF 110. Using an unfiltered environment map can lead to annoying aliasing artifacts when the map contains details that are finer than a spacing of the light sources used to acquire the SRF.

While rendering the deformed SRF, the look-up function $L_{p^*}$ is applied to all lighting directions incident to the deformed model point p*. This corresponds to a rotation of the environment map before evaluating the SRF with that environment. Thus, the rotated environment map needs to be refiltered according to the reflectance field sampling. This operation would have to be performed for every point in the deformed model. However, this is impractical because the filtering is a time-consuming operation for a non-uniform reflectance field sampling.

Therefore, we provide an alternative method for shading a deformed surface reflectance field. Our shading does not require filtering. Although the SRF 110 is acquired using directional lighting, we can simulate the lighting by point light sources with only negligible artifacts.

To shade 140 the deformed model point p* using a point light source, we start with a reflectance query (p*, l*, v*)

141, which describes a viewing ray to the point p*, and a direction l* to the point light-source as seen from the point p*.

By applying the look-up scheme (p, l, v)=L(p*, l*, v*) 130, we transform the query 141 from the object space 102 to the acquisition space 101.

The reflectance SRF(p, l, v) yields reflectance coefficients 142 that can be used to shade the point p with a color $I_p$:

$$I_p = SRF(p,l,v)A(\|p-p_l\|)I_l, \quad (11)$$

where $I_l$ is the color of the light source at the point $p_l$, and A(d) is a light attenuation factor depending on the distance to the light source. Using the deformed model point p* instead of a point on the surface of the object 103 introduces an error in the incident lighting direction. Usually, this error is small compared to the resolution of the SRF.

In contrast to environment mapping, our method uses the SRF queries 141 for lighting directions that are not present in the reflectance images 112. We rely on the SRF implementation to properly interpolate novel lighting directions, as described below. The approximation of point light-sources enables dynamic lighting effects when deforming and animating surface reflectance fields according to the invention.

However, our look-up function 130 ignores global lighting effects. These effects may appear wrong on the deformed model. Therefore, point light sources can be used to implement environment mapping, without the need to refilter the environmental map for every deformed model point. This can be done by properly sub-sampling the environment map once for a dense set of directions. Then, the point light sources are defined at these directions, and colored by the corresponding values of the environment.

If the sub-sampling is sufficiently dense, then lighting the model with the point light sources leads to an appropriate reconstruction of the lighting environment. Note that light direction interpolation implicitly acts as a reconstruction filter. Thus, adaptively filtering the environment map is used instead of interpolation. This alternative scheme is easier to implement and fits naturally into the framework of point light sources. For more flexible lighting effects, environment maps and point light sources can be combined.

Our method has significant advantages. Surface reflectance properties are preserved without explicitly considering the surface normals of the object 103. Moreover, our method can also be applied to many other image-based applications where the exact object normals are not known. An important property of our look-up scheme is that, in the limit, the BRDF preservation is exact, as the SRF 110 of the model 111 converges to the shape of the object 103. Our method 100 benefits directly from improvements in the model representations, for example, for models acquired with laser range scanning.

Surfel Representation

One prior art method for rendering a surface reflectance fields uses a point-based representation of the model. In that method, the model includes densely sampled surface elements (surfers). Surfels are discrete, zero-dimensional points in $R^3$, augmented by additional attributes, such as normal, radius, and some color properties, U.S. Pat. No. 6,448,968, "Method for rendering graphical objects represented as surface elements," issued to Pfister et al., on Sep. 10, 2002, incorporated herein by reference. In that representation, the normal indicates the surface orientation, and the radius is an approximate, circular region of 'influence'.

Surface points can be rendered using elliptical weighted average (EWA) texture filtering, U.S. Pat. No. 6,744,435, "Rendering discrete sample points projected to a screen space with a continuous resampling filter," issued to Zwicker et al. on Jun. 1, 2004. EWA surface splatting is a forward-mapping process that enables high quality, aliasing-free rendering of point sampled geometry. Although featuring high image quality, the surfel renderer as used there is not suited for our purposes. That method arranges the surface elements in a static layered depth cube (LDC) tree, which is a fixed, axis aligned spatial data structure that cannot be deformed and animated according to the present invention.

Instead, we use a more advanced form of EWA surface splatting that can render unorganized point-sets. Thus, we can accommodate dynamically changing point sets. Deformations of the model can lead to visible holes in the point-based reconstruction. For reasonable deformations, the holes can be avoided by deforming the splat geometry appropriately.

Figure 5:
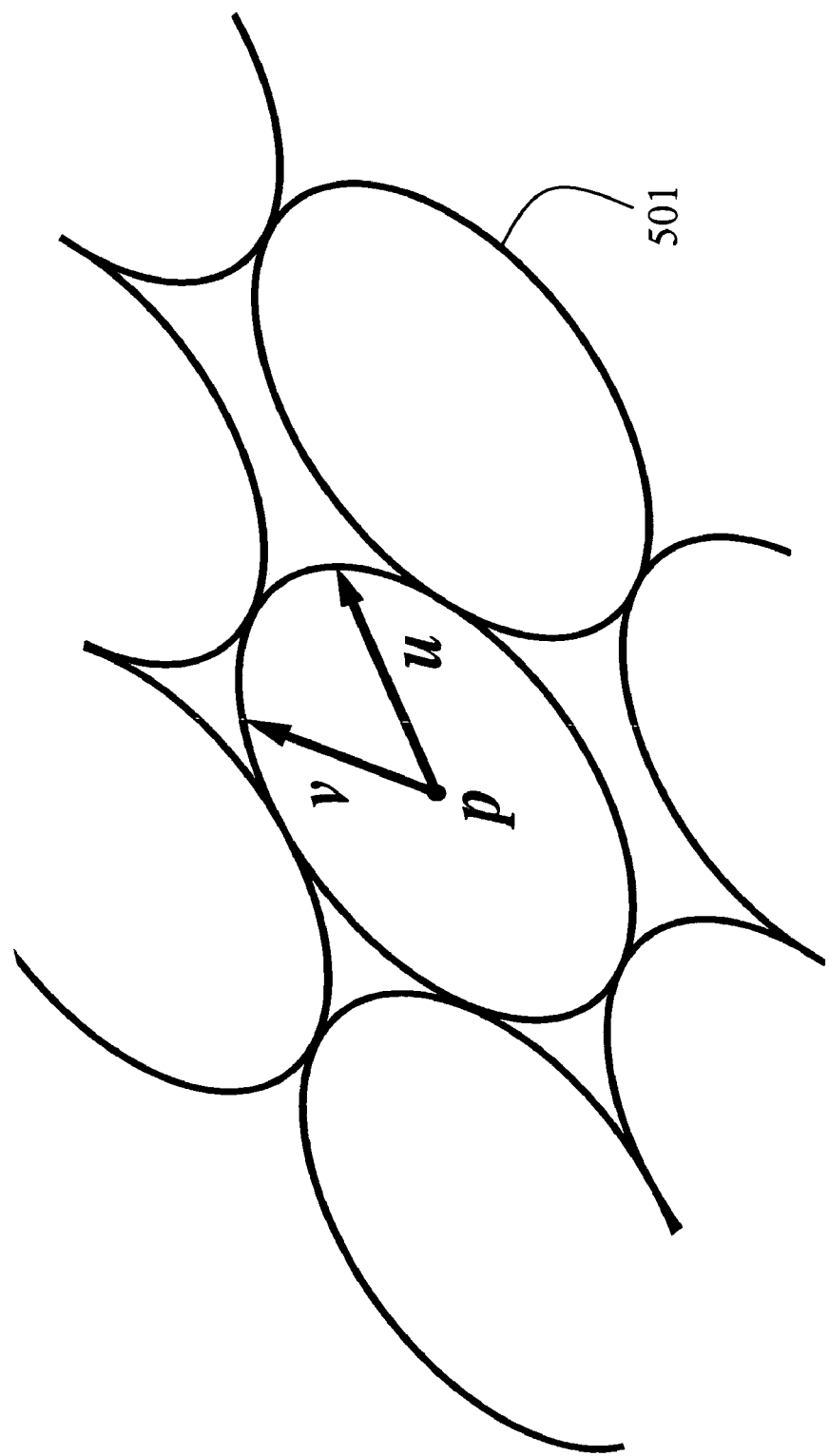
FIG. 5 is a schematic of elliptical surface splats according to the invention.

As shown in FIG. 5, we use elliptical surface splats 501. In contrast to circular splats that use a position-normal parameterization, our surface splats are defined by a position of the point p and two tangential vectors u and v, spanning a tangential coordinate system. The vectors u and v are explicitly allowed to be non-orthonormal. The surfel is associated with an elliptical region of influence defined by the tangential system.

When deforming 120 the model 111, the deformation is applied to the tangential system of each surface element by using an affine approximation of the local deformation. In our implementation, this approximation is determined as described above for the vectors (u, v). This ensures surface coverage as long as the first derivative of the deformation does not change excessively.

The tangential vectors u and v directly provide the corresponding parameters of our local parameterization of the model. By adding the original position $p_0$ of the surface element, and its orientation $r_0$ to the set of surface element attributes, all model parameters required for the deformed SRF rendering are encoded in the surfels.

Reflectance Image Interpolation

In general, each surface reflectance field look-up SRF(p, l, v) 141 is interpolated from the set of reflectance images 112. Depending on the viewing ray p+sv, s ∈ R, the query 141 is handled by interpolating between the observing views of the SRF. View interpolation is a common problem in image-based rendering. We use an unstructured lumigraph interpolation for unstructured lumigraph rendering (ULR), C. Buehler, M. Bosse, L. McMillan, S. Gortler, and M. Cohen, "Unstructured lumigraph rendering," *Computer Graphics*, SIGGRAPH 2001, Proceedings, pp. 425–432, 2001. ULR interpolation is a flexible interpolation scheme that can be controlled by an arbitrary penalty function, rating the appropriateness of each viewpoint.

In our implementation, we use a penalty function derived from one described by W. Matusik, H. Pfister, A. Ngan, P. Beardsley, R. Ziegler, and L. McMillan, "Image-based 3D photography using opacity hulls," *ACM Transaction on Graphics*, 21(3), pp. 427–437, July 2002.

There, the queried lighting direction l is always selected from the set of acquired lighting directions by sampling a stationary environment map. However, because our point light source implementation uses arbitrary lighting directions, we have to interpolate reflectance queries between the acquired lighting directions as well. By treating the light sources of the acquisition stage as cameras at an infinite distance, we enable ULR for light source interpolation.

By using ULR for light source selection, we can consider occlusions in the scene. If an observed object point is not visible for a given rendering viewpoint, then the light source is not be considered for interpolation. When interpolating between light sources, there are no visibility constraints, because shadowing effects are already in the acquired reflectance images 112. By taking occlusion into account, the appearance of translucent or refractive materials is changed.

Reordered Evaluation

Figure 6:
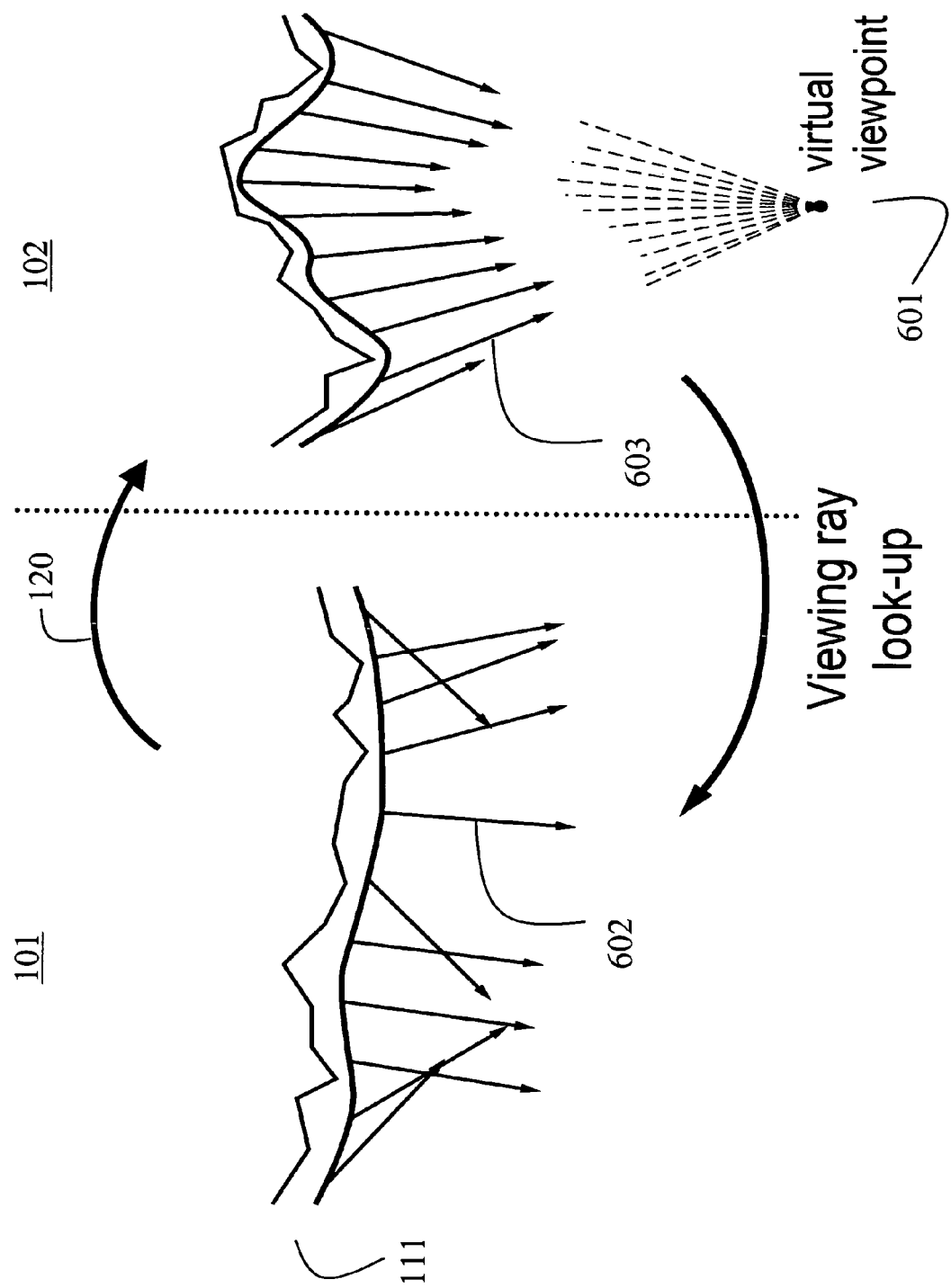
FIG. 6 is a schematic of a schematic of viewing rays in acquisition and object spaces.

As shown in FIG. 6, compared to the shading of static objects, substantially more reflectance images are involved while shading 140 the deformed model 113. This is because the rendered viewing rays 603 tend to diverge when the viewing rays 602 are mapped to the acquisition space 101 from the object space 102 when the model is deformed and rendered from a single arbitrary viewpoint 601.

The number of reflectance images 112 required for the shading 140 increases as the amount of deformation increases. Because the SRF 112 can exceed the size of a conventional main memory, we store the associated SRF on a disk. The time required for disk access exceeds all other computation times by orders of magnitude. This makes the performance of the SRF look-up 140 a critical issue, especially when producing animated SRFs.

We address this problem with two techniques. A relatively small cache stores most recently used blocks of SRF data. Unfortunately, naively shading the deformed model 113 adversely affects cache coherency. Thus, in a second technique, all shading operations are decomposed into minimal shading operations, each being a single SRF look-up. A shading operation includes a set of operands {REF (S), ($i_c$, $i_l$), ($x_c$, $y_c$), ($\omega_r$, $\omega_g$, $\omega_b$)} for a model points shown in Table B. The shading operation is executed by looking-up the reflectance image ($i_c$, $i_l$) at a pixel position ($x_c$, $y_c$) for a point S. The resulting RGB reflectance coefficient 142 is weighted by ($\omega_r$, $\omega_g$, $\omega_b$), and added to the color of the point model.

TABLE B

| Operand | Description |
| --- | --- |
| REF(S) | Reference to the target point. |
| ($i_c$, $i_l$) | Camera and light source index in reflectance image look-up. |
| ($x_c$, $y_c$) | Pixel position in the reflectance image. |
| ($\omega_r$, $\omega_g$, $\omega_b$) | Color weights. |

The execution of the shading operation is deferred until a larger number of operations are collected. Sorting the operations before execution in a cache-optimal way decreases shading times by an order of magnitude. Moreover, due to the cache coherent shading execution, the cache can be kept very small. In our system, it the cache stores three reflectance images at any one time. To facilitate the deferred shading, we accumulate all colors first, before rendering the colors to a frame buffer.

EFFECT OF THE INVENTION

The invention provides a method for rendering deformed and animated surface reflectance fields. The method approximately preserves all material properties of an acquired model during deformation. An appearance preserving data look-up scheme employs a local parameterization of the model.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer implemented method for rendering a model of an object, comprising the steps of:
    acquiring, in an acquisition space, a reflectance field of the object, the reflectance field including a set of reflectance images of the object and a model of the object, the model including a plurality of points;
    deforming, in an object space, the model to generate a deformed model;
    querying, for each point of the deformed model in the object space, the set of the reflectance images in the acquisition space to obtain reflectance coefficients for each point, in which a query for each point includes a set of operands {Ref(S), ($i_c$, $i_l$), ($x_c$, $y_c$), ($\omega_r$, $\omega_g$, $\omega_b$)}, where Ref(S) refers to the point, $i_c$ is a camera index, $i_l$ is a light source index, ($x_c$, $y_c$) is an index for a reflectance image, and ($\omega_r$, $\omega_g$, $\omega_b$) are color weights;
    shading each point according to the corresponding reflectance coefficients to generate an image of the object corresponding to the deforming; and rendering said generated image of said object.

2. The method of claim 1, in which the querying applies a look-up function to the set of reflectance images.

3. The method of claim 2, in which the look-up function is

L: (p*,l*,v*)↦(p,l,v), where p*, l*, v* and p, l, v are the point, lighting direction and viewing direction in the object space and acquisition space, respectively.

4. The method of claim 1, in which the deforming, querying, and shading are repeated in real-time to animate the model as a sequence of images.

5. The method of claim 1, further comprising:
    constructing the model from silhouette images of the object.

6. The method of claim 1, further comprising:
    constructing the model from laser range data of the object.

7. The method of claim 1, in which the model is a mesh of 2D polygons.

8. The method of claim 1, in which the model is a set of discrete zero-dimensional points.

9. The method of claim 1, in which the model is represented parametrically.

10. The method of claim 1, further comprising:
    acquiring the set of reflectance images by a camera at various viewpoints and under varying directional lighting.

11. The method of claim 10, further comprising:
    simulating the varying directional lighting by point light sources.

12. The method of claim 1, in which the querying interpolates the set of reflectance images.

13. The method of claim 1, in which the querying is for a particular viewing direction and particular incident light in the object space.

14. The method of claim 13, further comprising:
    mapping the viewing direction and the lighting direction from the object space to the acquisition space.

15. The method of claim 1, further comprising:
defining the deforming by a differentiable deformation function.

16. The method of claim 1, further comprising:
associating a set of vectors $\{p_0, r_0, u, v\}$ with each point, in which the vectors $p_0$ and $r_0$ are fixed and the vectors u and v are adapted by the deforming, and the vector $p_0$ is a position of the point in the acquisition, the vector $r_0$ is an orientation matrix of a tangential system in the acquisition frame of the point in the object space, and (u, v) is a local tangential frame in the object space of the point in the object space.

17. The method of claim 16, further comprising:
representing the orientation matrix as a Rodrigues vector.

18. The method of claim 16, the vectors u and v are determined according to:

$$u = \frac{1}{2\varepsilon}(\Psi(p_0 + \varepsilon u_0) - \Psi(p_0 - \varepsilon u_0)), \text{ and}$$

$$v = \frac{1}{2\varepsilon}(\Psi(p_0 + \varepsilon v_0) - \Psi(p_0 - \varepsilon v_0)), \text{ where}$$

ω represents the deforming for a small incremental value $\epsilon > 0$.

19. The method of claim 1, further comprising:
caching the reflectance images from a disk into a memory cache.

20. The method of claim 1, in which a plurality of queries are collected and sorted in a cache-optimal order.

* * * * *